(12) United States Patent
Kato et al.

(10) Patent No.: US 7,323,089 B2
(45) Date of Patent: Jan. 29, 2008

(54) BONDED MEMBRANE-ELECTRODE ASSEMBLY FOR ELECTROLYSIS OF WATER AND WATER ELECTROLYZER USING THE SAME

(75) Inventors: Eiji Kato, Inuyama (JP); Katsumi Kanematsu, Inuyama (JP); Shoji Nawa, Inuyama (JP); Yasuo Ido, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 646 days.

(21) Appl. No.: 10/853,146

(22) Filed: May 26, 2004

(65) Prior Publication Data

US 2004/0238353 A1    Dec. 2, 2004

(30) Foreign Application Priority Data

May 29, 2003    (JP)    ............................. 2003-152257

(51) Int. Cl.
  C25B 9/08    (2006.01)
(52) U.S. Cl. ................. 204/252; 204/255; 204/256; 204/257; 204/258; 204/260
(58) Field of Classification Search ............... 204/255, 204/256, 257, 258, 260, 252
See application file for complete search history.

(56) References Cited

U.S. PATENT DOCUMENTS 5,716,503 A * 2/1998 Dean et al. ................. 204/270

2002/0098407 A1 * 7/2002 Kunisa et al. ................. 429/44

FOREIGN PATENT DOCUMENTS

| JP | 11-269688 | 10/1999 |
| JP | 2000-064080 | 2/2000 |

\* cited by examiner

*Primary Examiner*—Bruce F. Bell
(74) *Attorney, Agent, or Firm*—Browdy and Neimark

(57) ABSTRACT

The present invention provides a bonded membrane-electrode assembly for electrolysis of water, which enables the generation of hydrogen capable of being used as a fuel for a fuel cell by electrolyzing water, and a water electrolyzer constructed using the bonded membrane-electrode assembly, so that hydrogen can be produced safely. The bonded membrane-electrode assembly includes a solid polymer electrolyte membrane, an oxygen electrode bonded to one of sides of the solid polymer electrolyte membrane, a hydrogen electrode bonded to the other side of the solid polymer electrolyte membrane. The oxygen electrode includes a porous sheet-shaped carbon element plated with iridium and coated with a mixture containing carbon and a resin for a solid polymer membrane. The hydrogen electrode includes a porous sheet-shaped carbon element which is coated with a mixture containing carbon and a resin for a solid polymer membrane and further coated with a mixture containing Pt (alloy) and/or Pt (alloy)-carried carbon and a resin for a solid polymer membrane.

2 Claims, 2 Drawing Sheets

US 7,323,089 B2

BONDED MEMBRANE-ELECTRODE ASSEMBLY FOR ELECTROLYSIS OF WATER AND WATER ELECTROLYZER USING THE SAME

FIELD OF THE INVENTION

The present invention relates to a bonded membrane-electrode assembly for electrolysis of water, and particularly, to a bonded membrane-electrode assembly which is constructed utilizing a solid polymer electrolyte membrane and an oxygen electrode and a hydrogen electrode bonded on opposite sides of the membrane and which can be used as a fuel cell, and to a water electrolyzer using the same.

RELATED ART

At present, a fuel cell attracts a great deal of attention as a generator tender to an environment and having a high efficiency, and has been developed so that it can be put to practical use. In the fuel cell, hydrogen, LPG (liquefied natural gas), alcohol or the like is used as a fuel, but particularly, if an environment is taken into consideration, hydrogen is most preferable, and hydrogen supplied from a bomb containing hydrogen sealedly filled therein or a bomb containing a hydrogen-absorption alloy filled therein is utilized.

To obtain hydrogen for this purpose, the electrolysis of water is carried out, and an apparatus for generating hydrogen by the electrolysis of water includes, particularly, a hydrogen-generating apparatus using an ion exchange membrane with brine such as sea water used as a supply water (for example, see the document cited herein, i.e., JP-A-2000-64080).

An insoluble electrode used for the electrolysis of brine includes an electrode whose base material can be inhibited from being damaged under a high current density condition and under a high voltage condition, but also includes a platinum-iridium based electrode which has a high hydrogen-generating efficiency and whose long life can be achieved (for example, see the document cited herein, i.e., JP-A-11-269688.

SUMMARY OF THE INVENTION

In such a water electrolyzer for carrying out a process for producing hydrogen, in general, hydrogen is generated by supplying an electric current in a state in which water is acidic or alkaline. In this case, an acid or base used is strongly acidic or strongly alkaline, resulting in a problem in safety.

The present invention has been accomplished in view of the above-described problem, and it is an object of the present invention to provide a bonded membrane-electrode assembly for electrolysis of water, wherein hydrogen capable of being used as a fuel for a fuel cell can be generated by electrolyzing pure water.

It is another object of the present invention to provide a water electrolyzer which is safe for use without use of strongly acidic or strongly alkaline water and which is constructed using a bonded membrane-electrode assembly for electrolysis of water according to the present invention.

To achieve one of the above objects, according to the present invention, there is provided a bonded membrane-electrode assembly for electrolysis of water, comprising a solid polymer electrolyte membrane, an oxygen electrode bonded to one of sides of the solid polymer electrolyte membrane, and a hydrogen electrode bonded to the other side of the solid polymer electrolyte membrane, the oxygen electrode including a porous sheet-shaped carbon element plated with iridium, and a coated layer formed of a mixture containing carbon and a resin for a solid polymer membrane on the side of the sheet-shaped carbon element contacting with the solid polymer electrolyte membrane, and the hydrogen electrode including a porous sheet-shaped carbon element, a coated layer formed of a mixture containing carbon and a resin for a solid polymer membrane on the sheet-shaped carbon element positioned on the side of the solid polymer electrolyte membrane, and another coated layer formed of a mixture containing Pt (alloy) and/or Pt (alloy)-carried carbon and a resin for a solid polymer membrane.

To achieve the other object, according to the present invention, there is provided a water electrolyzer, comprising at least one bonded membrane-electrode assembly positioned between end plates, a fluid flow passage located through a center portion of the bonded membrane-electrode assembly to permit the flowing of a fluid therethrough, a single tie bolt passed through the fluid flow passage at the center portion of the bonded membrane-electrode assembly to integrate the above-described members, and fixing nuts threadedly fitted over opposite ends of the tie bolt for integrating clamping the bonded membrane-electrode assembly between the end plates with O-rings interposed therebetween, the bonded membrane-electrode assembly including a solid polymer electrolyte membrane, an oxygen electrode and a hydrogen electrode mounted on opposite sides of the solid polymer electrolyte membrane, a flow passage plate mounted adjacent to the side of the oxygen electrode, and a separator plate serving as a current collector plate and mounted adjacently outside the flow passage plate and outside the hydrogen electrode.

In the water electrolyzer, the bonded membrane-electrode assembly is constructed in such a manner that the oxygen electrode includes a porous sheet-shaped carbon element plated with iridium, and a coated layer formed of a mixture containing carbon and a resin for a solid polymer membrane on the side of the sheet-shaped carbon element contacting with the solid polymer electrolyte membrane, and the hydrogen electrode includes a porous sheet-shaped carbon element, and a coated layer formed of a mixture containing carbon and a resin for a solid polymer membrane on the sheet-shaped carbon element positioned on the side of the solid polymer electrolyte membrane, and a coated layer formed of a mixture containing Pt (alloy) and/or Pt (alloy)-carried carbon and a resin for a solid polymer membrane on the coated layer.

The bonded membrane-electrode assembly for electrolysis of water according to the present invention is produced in the following manner: the oxygen electrode is formed by plating the porous sheet-shaped carbon element with iridium and coating the porous sheet-shaped carbon element with the mixture containing the resin for the solid polymer membrane, and the hydrogen electrode is formed by coating the porous sheet-shaped carbon element with the mixture containing the carbon and the resin for the solid polymer membrane and further coating it with the mixture containing the Pt (alloy) and/or Pt (alloy)-carried carbon and the resin for the solid polymer membrane; the solid polymer electrolyte membrane is interposed between the oxygen electrode and the hydrogen electrode formed in the above manner; and these three members are integrated together by a press.

The bonded membrane-electrode assembly for electrolysis of water produced in this manner is immersed in water in a state in which a separator plate serving as a current collector plate is disposed on the oxygen electrode with a flow passage plate interposed therebetween, and a separator plate serving as a current collector plate is disposed directly on the hydrogen electrode, in both cases, outside the oxygen electrode and the hydrogen electrode sandwiching the solid polymer electrolyte membrane therebetween. Thus, when electric current is allowed to flow through the current collector plates, oxygen and hydrogen can be generated in the respective electrodes by transmission of only hydrogen ions which are positive ions, because the solid polymer electrolyte membrane is a positive ion exchange membrane.

In this case, the bonded membrane-electrode assembly is used at a voltage of 1.6 V at which the carbon of the electrode is not damaged, and the carbon element is plated with iridium in order to enable the electrolysis of water at such voltage. Thus, the bonded membrane-electrode assembly for electrolysis of water, whose carbon cannot be damaged and which is also excellent in durability, is provided.

The Pt (alloy) and/or Pt (alloy)-carried carbon acts as a catalyst for generating hydrogen gas by bonding of hydrogen ions with electrons.

In the use of the bonded membrane-electrode assembly for electrolysis of water according to the present invention, the water electrolyzer is provided by positioning at least one bonded membrane-electrode assembly, providing the fluid flow passage located through the center portion of the bonded membrane-electrode assembly to permit the flowing of a fluid therethrough, and clamping the bonded membrane-electrode assembly integrally between the end plates with the O-rings interposed therebetween by the single tie bolt passed through the fluid flow passage at the center portion and the fixing nuts threadedly fitted over the opposite ends of the tie bolt. In this case, the arrangement is not limited to the use of the single bonded membrane-electrode assembly, and a plurality of the bonded membrane-electrode assemblies may be stacked, whereby oxygen or hydrogen can be generated as required.

In order to enhance the adhesion with the porous sheet-shaped carbon element, a mixture further containing PTFE in addition to the carbon and the resin for the solid polymer membrane can be used for coating.

DETAILED DESCRIPTION OF THE PREFERRED EMBODIMENTS

A bonded membrane-electrode assembly for electrolysis of water according to an embodiment of the present invention will now be described with reference to the accompanying drawings.

Figure 1:
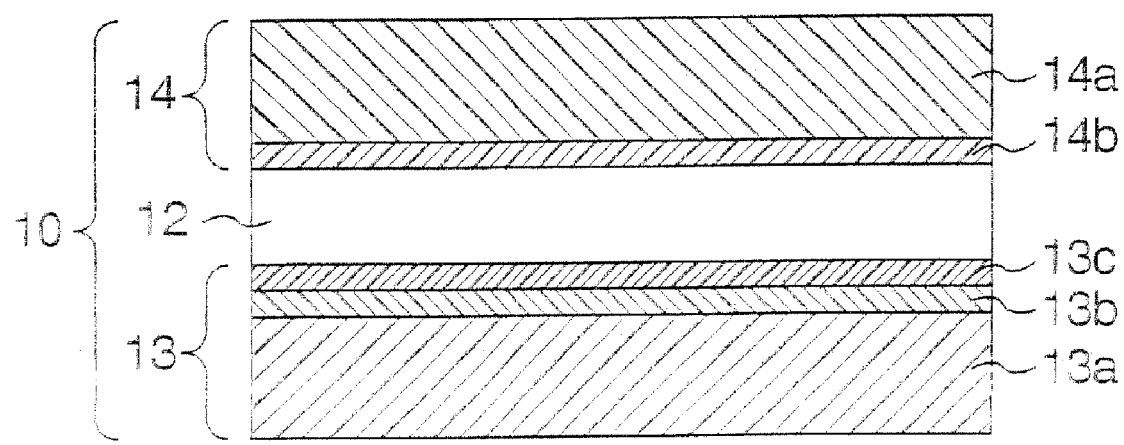
FIG. 1 is a schematic view of a bonded membrane-electrode assembly for electrolysis of water according to an embodiment of the present invention.
Figure 3:
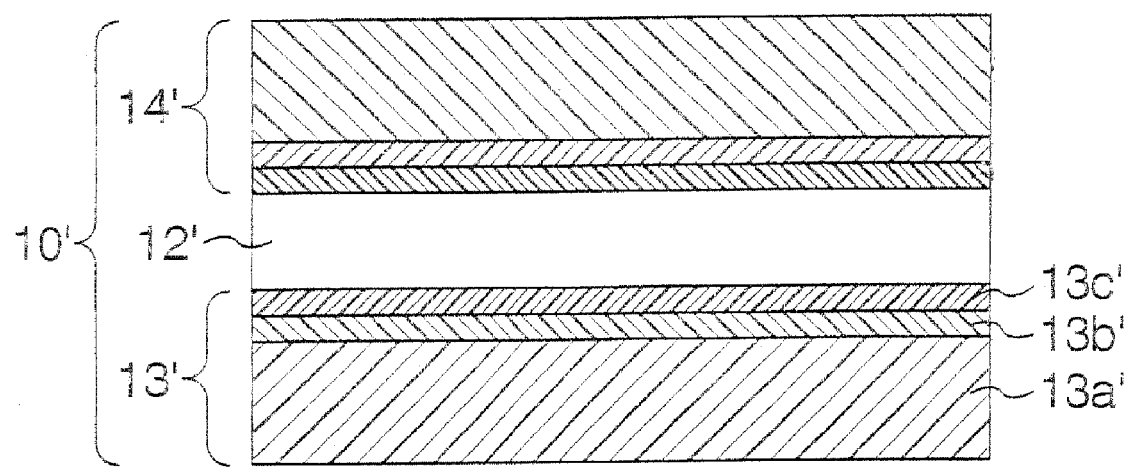
FIG. 3 is a schematic view of a bonded solid polymer electrolyte-electrode assembly capable of being used in a fuel cell corresponding to the bonded membrane-electrode assembly according to the embodiment of the present invention.
Figure 2:
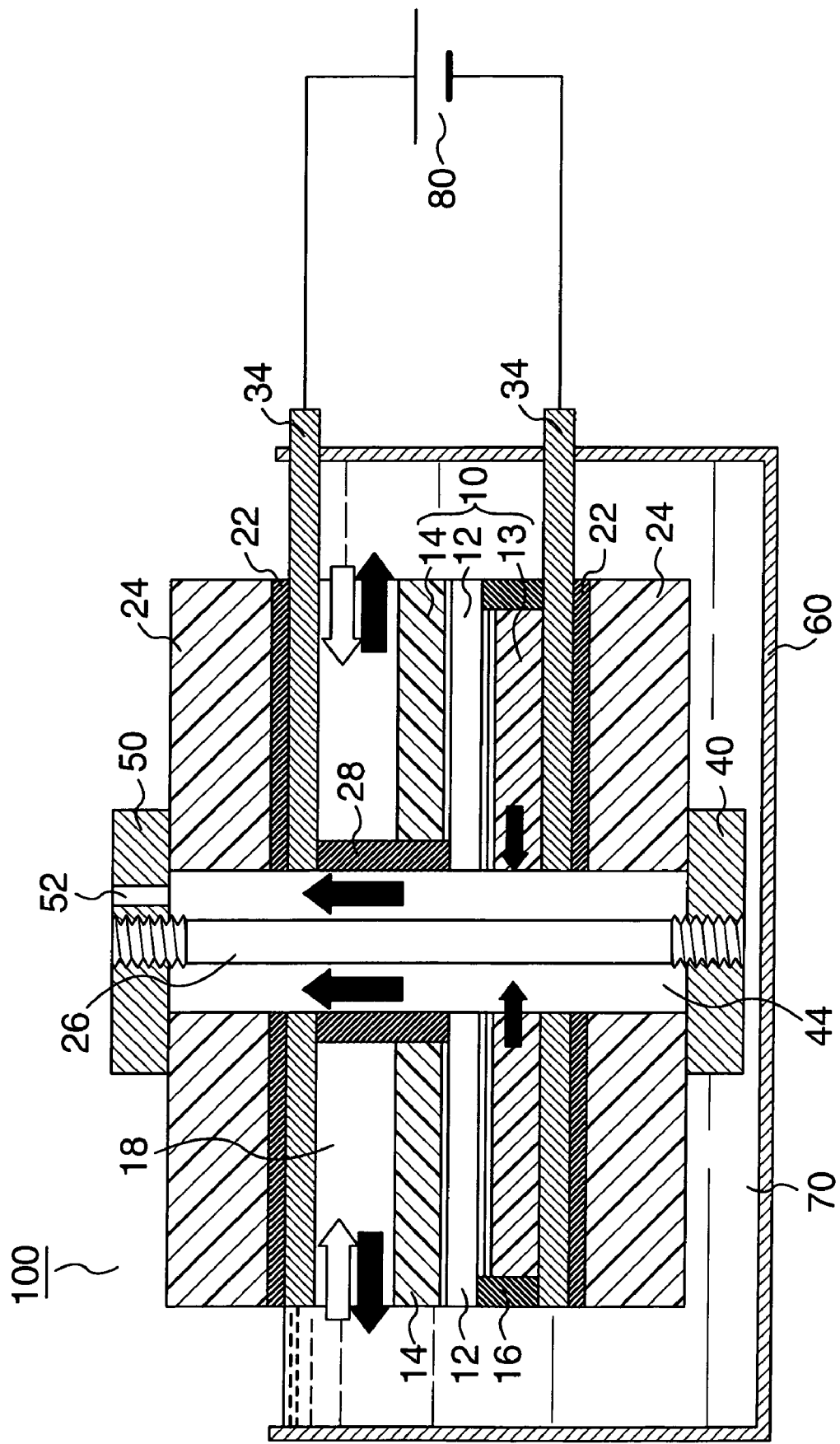
FIG. 2 is a schematic view of a water electrolyzer using the bonded membrane-electrode assembly according to an embodiment of the present invention.

FIG. 1 is a schematic view showing a bonded membrane-electrode assembly 10 for electrolysis of water; FIG. 2 is a schematic view of a water electrolyzer using the bonded membrane-electrode assembly; and FIG. 3 is a schematic view of a bonded solid polymer electrolyte-electrode assembly used in a fuel cell, which is to be compared.

First, a bonded membrane-electrodes assembly 10' to be compared with a bonded membrane-electrode assembly 10 for electrolysis of water according to the present invention will be described below with reference to FIG. 3. A solid polymer electrolyte membrane 12' made of a polymer material of perfluorocarbon sulfonic acid, a hydrogen electrode 13' and a oxygen electrode 14' disposed on opposite sides of the solid polymer electrolyte membrane 12' are bonded to one another. The hydrogen electrode 13' comprises a porous sheet-shaped carbon element 13a', a coated layer 13b' formed of a mixture containing carbon and a resin for a solid polymer membrane and bonded to the surface of the porous sheet-shaped carbon element 13a', and a coated layer 13c' formed of a mixture containing Pt (alloy) and/or Pt (alloy)-carried carbon and a resin for a solid polymer membrane and bonded to the coated layer 13b'.

An assembly formed by integrating the hydrogen electrode 13', the oxygen electrode 14' and the solid polymer electrolyte membrane 12' interposed therebetween by a press is used in a fuel cell using hydrogen as a fuel. In association with the assembly, a separator plate made of a stainless steel is mounted so that it is disposed outside the hydrogen electrode 13' and the oxygen electrode 14', whereby only hydrogen ions which are positive ions can be passed through the solid polymer electrolyte membrane 12' by the ion exchange in the solid polymer electrolyte membrane 12' between oxygen supplied to the oxygen electrode 14' and hydrogen supplied to the hydrogen electrode 13' to pick up electric current from the separator plate which is a current collector plate.

The bonded membrane-electrode assembly 10' is provided by making the electrodes, the catalyst and the ion exchange membrane integrated together. A Pt and/or a Pt alloy and/or Pt- and/or Pt alloy-carried carbon are used as the catalyst, and the solid polymer electrolyte membrane is used as the ion exchange membrane for permitting the transmission of only positive ions therethrough.

The bonded membrane-electrode assembly 10 according to the present invention is adapted to be able to generate oxygen and hydrogen by the electrolysis of water by reversing the generating action of the bonded membrane-electrode assembly 10', and has an arrangement which will be described below. As shown in FIG. 1, the bonded membrane-electrode assembly 10 for electrolysis of water comprises a hydrogen electrode 13 and an oxygen electrode 14 disposed with a solid polymer electrolyte membrane 12 interposed therebetween and made of a polymer material of perfluorocarbon sulfonic acid, as in the fuel cell.

The hydrogen electrode 13 comprises a porous sheet-shaped carbon element 13a subjected to a water-repellant treatment by PTFE, a coated layer 13b formed on the surface of the element 13a from a mixture containing carbon, PTFE and a resin for a solid polymer membrane, and a coated layer 13c further formed on the coated layer 13b from a mixture containing Pt (alloy) and/or Pt (alloy)-carried carbon and a resin for a solid polymer membrane.

The oxygen electrode 14 comprises a porous sheet-shaped carbon 14a plated with iridium and subjected to a water-repellant treatment, and a coated layer 14b formed on the surface of the element 14a from a mixture containing carbon, PTFE and a resin for a solid polymer membrane. In this case, a mixture containing Pt (alloy) and/or Pt (alloy)-carried carbon and a resin for a solid polymer membrane can be further coated, as in the hydrogen electrode 13.

In this case, the bonded membrane-electrode assembly 10 can be also used as a fuel cell.

The solid polymer electrolyte membrane 12 is interposed between the hydrogen electrode 13 and the oxygen electrode 14 each having such a structure, and they are integrated together by a press, thereby forming the bonded membrane-electrode assembly 10 for electrolysis of water.

The bonded membrane-electrode assembly 10 formed in the above-described manner can be used to carry out the electrolysis of water, thereby constituting a water electrolyzer 100. The water electrolyzer 100 according to the present invention will now be described with reference to FIG. 2.

The water electrolyzer 100 has an opening provided at a center portion of the bonded membrane-electrode assembly 10 having the above-described arrangement. In association with the membrane-electrode assembly 10, an outer seal 16 is mounted on the side of the hydrogen electrode 13 for directing hydrogen generated in the hydrogen electrode 13 toward a hydrogen flow passage 44 at a center portion of the assembly 10, and a separator plate 34 made of a stainless steel and functioning as a current collector plate is mounted in close contact on an outer surface of the assembly 10, as in the fuel cell. Further, an end plate 24 made of an epoxy resin is disposed on an outer surface of the separator plate 34 with an end gasket 22 interposed therebetween and made of a synthetic rubber such as EPDM. On the other hand, an oxygen flow passage plate 18 made of a carbon material is mounted adjacently on the side of the oxygen electrode 14, and a separator plate 34 having a function as a current collector plate is mounted adjacent axially outside the oxygen flow passage plate 18. Further, an end plate 24 is mounted axially outside the separator plate 34 with an end gasket 22 made of a synthetic rubber such as EPDM interposed therebetween. A hydrogen flow passage 44 is provided in both of the separator plates 34, 34, both of the end gaskets 22, 22 and both of the end plates 24, 24 in correspondence to the opening at the center portion of the membrane-electrode assembly 10, so that a through-bore is defined in the center portion. A tie bolt 26 threaded at opposite ends is mounted through the center of the hydrogen flow passage 44, and nuts 40 and 50 are tightened thereto with respect to axially outer surfaces of the end plates 24, thereby forming an integral structure.

In the integral structure formed in this manner, the inner seals 28 for inhibiting the flowing of oxygen into the hydrogen flow passage 44 are mounted to inner peripheral portions of the oxygen electrode 14 and the oxygen flow passage plate 18, which face to the opening at the center portion. One of the nuts 40 is formed to inhibit the flowing-out of generated hydrogen, and a through-bore 52 for picking up the generated hydrogen is provided properly in the other nut 50.

Further, the integral structure including the bonded membrane-electrode assembly 10 constructed in the above manner is placed and positioned so that it is immersed in water 70 in the water tank 60 at least to a depth corresponding to the separator plate 34 outside the oxygen electrode 14, thereby constituting the water electrolyzer 100.

If Pt is coated on the oxygen electrode 14 of the water electrolyzer 100 of the above-described arrangement on the side of generation of oxygen, then it is required that the voltage is set at 2 V or more in order to achieve the electrolysis of water. At such a voltage, however, the sheet-shaped carbon element 14a of the oxygen electrode 14 is subjected to the damage, resulting in a problem of durability. For this reason, iridium is coated on the sheet-shaped carbon element 14a of the oxygen electrode 14, whereby the electrolysis of water is possible at a voltage of 1.6 V or more. In addition, the damage to the carbon element can be avoided, and the durability of the carbon element is excellent.

The relationship among the voltage for the electrolysis, the generation of oxygen gas and the damage to the carbon element in cases of the catalyst Pt and iridium on the side of the oxygen electrode 14 is as follows:

TABLE 1

| | | Voltage (V) | | | | | |
|---|---|---|---|---|---|---|---|
| | | 1.2 | 1.4 | 1.6 | 1.8 | 2.0 | 2.2 |
| Pt | Generation of oxygen gas | N | N | N | N | G | N |
| | Damage to electrode | ○ | ○ | ○ | ○ | Δ | X |
| Iridium | Generation of oxygen gas | N | N | G | G | G | G |
| | Damage to electrode | ○ | ○ | ○ | ○ | ○ | ○ |

Note:
N: not generated;
G: generated;
○: not damaged;
Δ: partially damaged; and
X: damaged In the water electrolyzer 100, the bonded membrane-electrode assembly 10, the oxygen flow passage plate 18 and the separator plate 34 are immersed in the water 70. Therefore, when electric current is supplied from a power source 80 to both of the separator plates 34, 34, only hydrogen ions which are positive ions are transmitted from the side of the oxygen electrode 14 through the solid polymer electrolyte membrane 12 to reach Pt (alloy) coated on the hydrogen electrode 13, where it is reacted to generate hydrogen. The generated hydrogen is passed through the porous sheet-shaped carbon element 14a into the hydrogen flow passage 44 and then conducted to the outside through the through-bore 52 in the other nut 50, because the outer periphery of the hydrogen electrode 13 is covered with the outer seal 16 made of the synthetic rubber such as EPDM.

On the other hand, on the side of the oxygen electrode 14, oxygen is generated by the catalytic action of coated iridium, as in the hydrogen electrode 13, because the oxygen electrode 14 and the oxygen flow passage plate 18 are immersed in the water. In addition, because the oxygen flow passage plate 18 is made of the porous carbon element and because the inner seal 28 is disposed on the inner periphery facing to the hydrogen flow passage 44, the generated oxygen can be fed to the outer periphery of the oxygen electrode 14 and into the water 70.

As described above, the hydrogen generated by the water electrolyzer 100 is conducted in a direction shown by an arrow from the hydrogen flow passage 44 at the center portion and removed through the through-bore 52 in the other nut 50. For example, the hydrogen can be introduced as a fuel for a fuel cell directly into the fuel cell, or introduced into and once stored in a storage tank and then utilized as a fuel for a fuel cell.

The bonded membrane-electrode assembly 10 has been described as being used singly in the above-described water electrolyzer, but as required, a plurality of the bonded membrane-electrode assemblies 10 can be disposed in an integrally stacked manner between the end plates 24, 24.

The bonded membrane-electrode assembly 10 for the electrolysis of water according to the present invention provides the following effects by virtue of the above-described arrangement:

In the bonded membrane-electrode assembly 10 having the above-described arrangement, the porous sheet-shaped carbon element plated with iridium is employed in the oxygen-generating electrode, and hence, the electrolysis can be achieved at 1.6 V, whereas the voltage of 2 V or more is required in the case of the Pt (alloy)-carried carbon element. Therefore, the electrolysis can be carried out without a damage to the carbon element, and the bonded membrane-electrode assembly has an excellent durability. This is provided as an excellent effect.

In addition, the water electrolyzer can be constructed in a structure of a size substantially equal to that of the fuel cell by the bonded membrane-electrode assembly. The bonded membrane-electrode assembly is immersed in the water tank, and the separator plates are mounted adjacently on the opposite sides of the oxygen flow passage on the side of the oxygen electrode of the bonded membrane-electrode assembly, whereby the electrolysis of water can be carried out by supplying an electric current to the separators. Therefore, hydrogen can be generated from pure water by the electrolysis, and it is unnecessary to conduct the electrolysis of strongly acidic or strongly alkaline water, leading to an effect that it is possible to provide a safe water electrolyzer.

What is claimed is:

1. A bonded membrane assembly for electrolysis of water comprising;
   (a) a solid polymer electrolyte membrane;
   (b) an oxygen electrode bonded to one side of said solid polymer electrolyte membrane;
   (c) a hydrogen electrode bonded to the other side of said solid polymer electrolyte membrane;
   (d) wherein said oxygen electrode includes a porous sheet-shaped carbon element plated with iridium and a first coating layer comprising a mixture of carbon and a resin for a solid polymer membrane on the side of the sheet-shaped carbon element that contacts the solid polymer electrolyte membrane;
   (e) the hydrogen electrode comprises a porous sheet-shaped carbon element and a second coating layer comprising a mixture of carbon and a resin for a solid polymer membrane on said sheet-shaped carbon element positioned in contact with the solid polymer electrolyte membrane; and
   (f) a third coating layer comprising at least one of a Pt (alloy) and carbon carrying a Pt (alloy) and a resin for a solid polymer membrane on said second coating layer.

2. A water electrolyzer comprising:
   (a) at least one bonded membrane-electrode assembly positioned between end plates;
   (b) a fluid flow passage located through a center portion of said bonded membrane electrode assembly to permit a fluid to flow therebetween;
   (c) a single tie bolt passed through said fluid flow passage at the center portion of said bonded membrane electrode assembly to integrate the portions;
   (d) fixing nuts threadedly fitted over opposite ends of the tie bolt for clamping said bonded electrode assembly between said end plates with O-rings interposed therebetween;
   (e) wherein said bonded membrane electrode assembly includes a solid polymer electrolyte membrane, an oxygen electrode and a hydrogen electrode mounted on opposite sides of said solid polymer electrolyte membrane;
   (f) a flow passage plate mounted adjacent the side of the oxygen electrode, and a separator plate serving as a current collector plate and mounted outside said flow passage plate and outside the hydrogen electrode;
   (g) wherein said bonded membrane electrode assembly is constructed in such a manner that said oxygen electrode includes a porous sheet-shaped carbon element plated with iridium, and a first coating layer comprising a mixture of carbon and a resin for a solid polymer membrane on the side of said sheet-shaped carbon element that is in contact with the said solid polymer electrolyte membrane;
   (h) said hydrogen electrode includes a porous sheet-shaped carbon element and a second coating layer comprising a mixture of carbon and a resin for a solid polymer membrane on said sheet-shaped carbon element positioned on the side of the solid polymer electrolyte membrane;
   (i) a third coating layer comprising a mixture of at least one of Pt (alloy) and carbon carrying Pt (alloy) and a resin for a solid polymer membrane on said second coating layer.

* * * * *